United States Patent
Matsuda et al.

(10) Patent No.: US 9,331,449 B2
(45) Date of Patent: May 3, 2016

(54) GAS LASER OSCILLATOR CAPABLE OF CONTROLLING GAS PRESSURE AND GAS CONSUMPTION AMOUNT

(71) Applicant: FANUC CORPORATION, Minamitsuru-gun, Yamanashi (JP)

(72) Inventors: Munekazu Matsuda, Yamanashi (JP); Hiroyuki Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/797,735

(22) Filed: Jul. 13, 2015

(65) Prior Publication Data

US 2016/0013606 A1 Jan. 14, 2016

(30) Foreign Application Priority Data

Jul. 14, 2014 (JP) ................. 2014-144501

(51) Int. Cl.
*H01S 3/22* (2006.01)
*H01S 3/036* (2006.01)
*H01S 3/223* (2006.01)
*H01S 3/225* (2006.01)

(52) U.S. Cl.
CPC . *H01S 3/036* (2013.01); *H01S 3/22* (2013.01); *H01S 3/225* (2013.01); *H01S 3/2207* (2013.01); *H01S 3/2215* (2013.01); *H01S 3/2222* (2013.01); *H01S 3/2232* (2013.01); *H01S 3/2237* (2013.01); *H01S 3/2251* (2013.01); *H01S 3/2256* (2013.01)

(58) Field of Classification Search
CPC .......... H01S 3/036; H01S 3/22; H01S 3/225; H01S 3/2207; H01S 3/2215; H01S 3/2222; H01S 3/2232; H01S 3/2251; H01S 3/2256

USPC ................................ 372/59, 58, 55
See application file for complete search history.

(56) References Cited

U.S. PATENT DOCUMENTS

| | | | |
|---|---|---|---|
| 8,897,331 B2 | 11/2014 | Yamamoto | |
| 2011/0243177 A1 * | 10/2011 | Nishio | H01S 3/036 372/58 |
| 2014/0247855 A1 * | 9/2014 | Yamamoto | H01S 3/134 372/58 |
| 2015/0188274 A1 * | 7/2015 | Wakabayashi | H01S 3/134 372/25 |

FOREIGN PATENT DOCUMENTS

| | | |
|---|---|---|
| JP | H01-179479 A | 7/1989 |
| JP | H03-166784 A | 7/1991 |
| JP | H04-176178 A | 6/1992 |
| JP | H05-226731 A | 9/1993 |
| JP | 2011228624 | 11/2011 |
| JP | 2013-026302 A | 2/2013 |
| JP | 2013-042000 A | 2/2013 |
| JP | 2014165189 | 9/2014 |
| WO | 2013171951 | 11/2013 |

\* cited by examiner

*Primary Examiner* — Kinam Park
(74) *Attorney, Agent, or Firm* — RatnerPrestia (57) ABSTRACT

A gas laser oscillator includes a first control valve for controlling an amount of laser gas supplied into a gas container, a second control valve for controlling an amount of laser gas exhausted from the gas container, and a controller for controlling openings of the first and second control valves. The controller includes a storage unit for storing data indicating a relationship between the laser gas pressure in the gas container, the opening of the second control valve, and the exhaust amount of laser gas, a gas pressure control unit for controlling the openings of the first and second control valves, respectively, such that the laser gas pressure becomes closer to a reference gas pressure, and a gas consumption amount control unit for controlling the openings of the first and second control valves, respectively, such that the exhaust amount of laser gas becomes closer to a target consumption amount.

3 Claims, 5 Drawing Sheets

|  |  | AMOUNT OF GAS EXHAUSTION | | |
|---|---|---|---|---|
|  |  | >TARGET CONSUMPTION AMOUNT | =TARGET CONSUMPTION AMOUNT | <TARGET CONSUMPTION AMOUNT |
| GAS PRESSURE DETECTION VALUE | >REFERENCE GAS PRESSURE | DECREASE V1 INCREASE V2 | INCREASE V2 | INCREASE V2 |
| | =REFERENCE GAS PRESSURE | DECREASE V1 DECREASE V2 | — | INCREASE V1 INCREASE V2 |
| | <REFERENCE GAS PRESSURE | INCREASE V1 DECREASE V2 | INCREASE V1 | INCREASE V1 |

GAS LASER OSCILLATOR CAPABLE OF CONTROLLING GAS PRESSURE AND GAS CONSUMPTION AMOUNT

BACKGROUND ART

1. Technical Field

The present invention relates to a gas laser oscillator that oscillates laser using laser gas as a medium.

2. Description of the Related Art

When performing laser oscillation in a gas laser oscillator installed in a laser processing machine, the pressure of laser gas is controlled to a predetermined magnitude. If a gas pressure in a gas container fluctuates, the magnitudes of voltage and current to excite the laser gas fluctuate as well, a result of which laser output changes. Accordingly, in order to achieve stable laser output, high speed and high precision control of laser gas pressure is needed.

The gas pressure in the gas container is controlled by adjusting an amount of laser gas supplied into the gas container and an amount of laser gas exhausted from the gas container. For example, JP 2013-042000 A and JP H05-226731 A disclose a gas laser oscillator configured such that a control valve is provided at one of a laser gas supply unit and a laser gas exhaustion unit to supply or exhaust a constant amount of laser gas.

However, in order to improve the accuracy of gas pressure control, it is necessary to repeatedly carry out supply and exhaustion of laser gas in a short period of time, which results in an increase in the amount of consumption of the laser gas, thereby increasing the operation cost of the gas laser oscillator. JP 2013-026302 A, JP H01-179479 A, JP H03-166784 A, and JP H04-176178 A disclose a technique for controlling a consumption amount of laser gas using detection means for detecting a supply amount of the laser gas and an exhaust amount of the laser gas. However, such gas laser oscillators need to be provided with an additional detection means, thus increasing the cost.

Accordingly, there is a need for an inexpensive gas laser oscillator that can execute gas pressure control at high speed and with high precision and also can control the consumption amount of laser gas.

SUMMARY OF THE INVENTION

According to a first invention of the present application, there is provided a gas laser oscillator, comprising: a gas container for containing a laser gas; a first sensor for detecting a laser gas pressure in the gas container; a gas supply source for supplying the laser gas into the gas container; a vacuum pump for exhausting the laser gas from the gas container; a first control valve capable of controlling a supply amount of laser gas supplied into the gas container by adjusting an opening of the first control valve; a second control valve capable of controlling an exhaust amount of the laser gas exhausted from the gas container by adjusting an opening of the second control valve; and a controller for controlling the openings of the first control valve and the second control valve, respectively, the controller comprising: a first storage unit for storing data that indicates a relationship between the laser gas pressure in the gas container, the opening of the second control valve, and the exhaust amount of the laser gas; a gas pressure control unit for controlling the openings of the first control valve and the second control valve, respectively, such that the laser gas pressure in the gas container becomes closer to a reference gas pressure; and a gas consumption amount control unit for controlling the openings of the first control valve and the second control valve, respectively, such that the exhaust amount of the laser gas becomes closer to a target consumption amount.

According to a second invention of the present application, the gas laser oscillator according to the first invention, further comprising: a power supply for supplying excitation energy for the laser gas in the gas container; and a second sensor for detecting a voltage or a current supplied from the power supply, wherein the controller further comprises: a second storage unit for storing a reference voltage or a reference current; a comparison unit for comparing the voltage or the current detected by the second sensor with the reference voltage or the reference current; and a gas consumption amount setting unit for setting the target consumption amount on the basis of a result of the comparison by the comparison unit.

According to a third invention of the present application, in the gas laser oscillator according to the first invention, the controller further comprises a gas consumption amount setting unit for setting the target consumption amount according to an operation state of the gas laser oscillator.

These and other objects, features and advantages of the present invention will become more apparent in light of the detailed description of exemplary embodiments thereof as illustrated in the drawings.

DETAILED DESCRIPTION OF THE INVENTION

Hereinafter, embodiments of the present invention will be described with reference to the accompanying drawings. The same or corresponding elements will be denoted by the same reference numerals.

Figure 1:
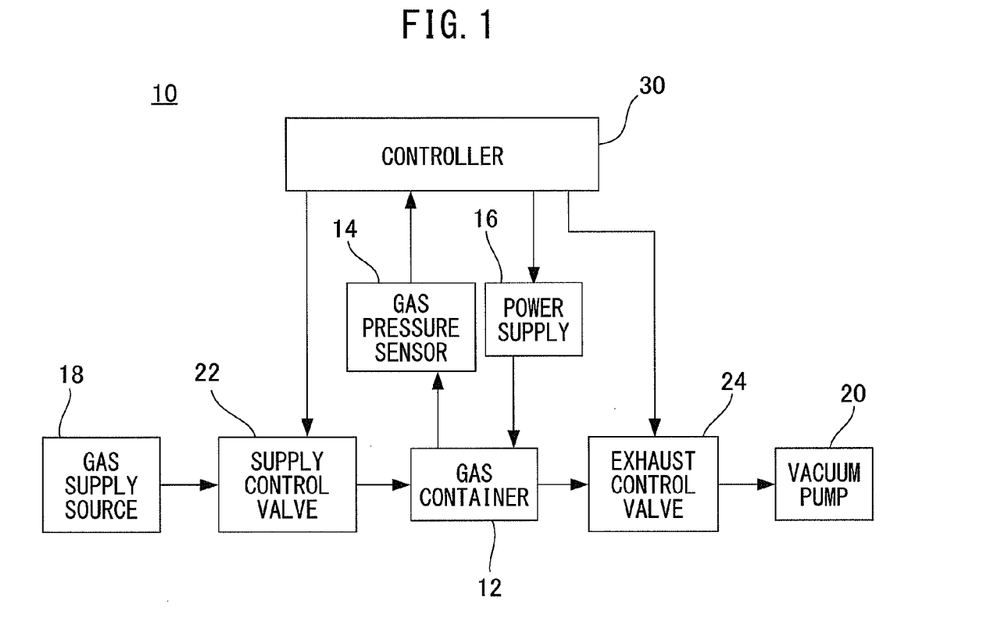
FIG. 1 is a diagram depicting a configuration of a gas laser oscillator according to a first embodiment.

FIG. 1 depicts an exemplary configuration of a gas laser oscillator 10 according to a first embodiment. The gas laser oscillator 10 is used, for example, in a laser processing apparatus (not shown) for cutting a workpiece such as a sheet metal. The gas laser oscillator 10 includes a gas container 12, a gas pressure sensor 14, a power supply 16, and a controller 30.

The gas container 12 contains laser gas which serves as a medium when oscillating laser. The laser gas is, for example, a mixed gas including carbon dioxide, nitrogen, helium, and the like in a predetermined composition ratio. The gas container 12 contains laser gas at a pressure (gauge pressure) of, for example, −100 kPa to −70 kPa.

To the gas container 12 is connected a replaceable gas supply source 18 via a supply control valve 22. The gas supply source 18 may be in the form of a laser gas-containing cylinder or the like. A vacuum pump 20 is also connected to the gas container 12 via an exhaust control valve 24. The vacuum pump 20 generates negative pressure to exhaust laser gas out of the gas container 12.

The supply control valve 22 controls an amount of laser gas supplied into the gas container 12 from the gas supply source 18 by adjusting the opening of the supply control valve 22. The exhaust control valve 24 controls an amount of laser gas exhausted from the gas container 12 by adjusting the opening of the exhaust control valve 24. The openings of the supply control valve 22 and the exhaust control valve 24, respectively, are controlled by the controller 30. The supply control valve 22 and the exhaust control valve 24 are, for example, known solenoid control valves capable of adjusting the openings thereof in response to an input current or voltage. Preferably, the openings of the supply control valve 22 and the exhaust control valve 24 are adjustable substantially continuously so that a supply amount and an exhaust amount of laser gas can be controlled with high precision.

The laser gas in the gas container 12 is controlled to maintain a predetermined pressure (hereinafter may be referred to as "reference gas pressure") in order to ensure that electric discharge stably occurs when predetermined magnitude of electric power is applied. The laser gas pressure in the gas container 12 is controlled by adjusting the amount of laser gas supplied into the gas container 12 and the amount of laser gas exhausted from the gas container 12, respectively. For example, when the amount of laser gas supplied into the gas container 12 exceeds the amount of laser gas exhausted from the gas container 12, the laser gas pressure increases. Conversely, when the amount of laser gas exhausted from the gas container 12 exceeds the amount of laser gas supplied into the gas container 12, the laser gas pressure is reduced.

Figure 5:
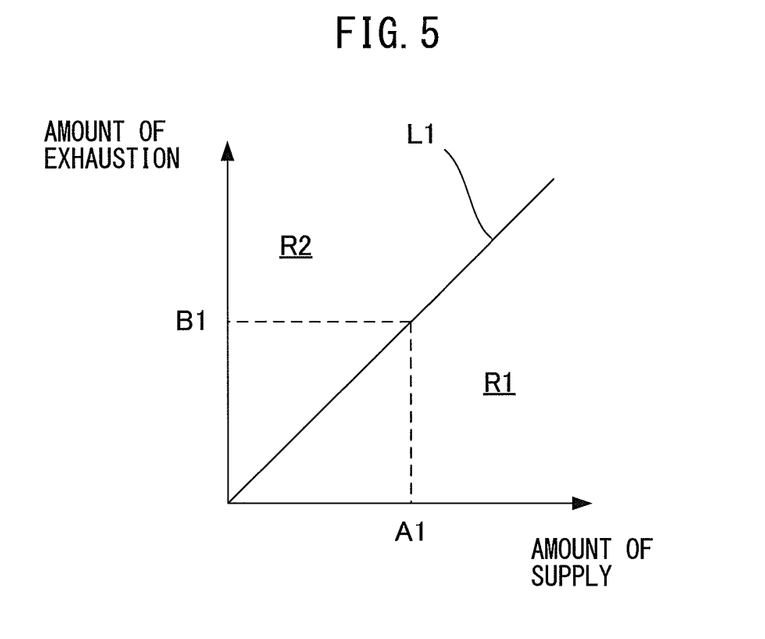
FIG. 5 is a graph showing a relationship between a supply amount of laser gas, and an exhaust amount of laser gas, and laser gas pressure.

FIG. 5 is a graph showing a relationship between the supply amount of laser gas, and the exhaust amount of laser gas, and the laser gas pressure. The horizontal axis of the graph represents the supply amount of laser gas, and the vertical axis thereof represents the exhaust amount of laser gas. A straight line L1 in the graph indicates a condition under which the laser gas pressure is maintained at a constant level. In other words, when the supply amount of laser gas is equal to the exhaust amount of laser gas, the laser gas pressure is maintained at a constant level.

In a region R1 on a right side of the straight line L1, the supply amount of laser gas exceeds the exhaust amount of laser gas. Accordingly, the pressure in the gas container 12 increases within the range of the region R1. On the other hand, in a region R2 on a left side of the straight line L1, the supply amount of laser gas is below the exhaust amount of laser gas, so that the pressure in the gas container 12 reduces.

"A1" and "B1" in FIG. 5 represent a supply amount and an exhaust amount of laser gas, respectively, which correspond to a target value of a consumption amount of laser gas (hereinafter may be referred to as "target consumption amount"). In addition, the "consumption amount of laser gas" means an amount of laser gas consumed per unit time in the gas laser oscillator 10. For example, when the laser gas pressure in the gas container 12 is maintained at a constant level, the consumption amount of the laser gas is equal to an amount of laser gas supplied into the gas container 12 per unit time and an amount of the laser gas exhausted from the gas container 12 per unit time, respectively. In the present specification, the exhaust amount of laser gas will be regarded as the consumption amount of laser gas.

Referring back to FIG. 1, the gas pressure sensor 14 detects laser gas pressure in the gas container 12. A detection value detected by the gas pressure sensor 14 is input to the controller 30 and used to control the laser gas pressure in the gas container 12.

The power supply 16 supplies electric power to a discharge electrode for electric discharge. The electric power provides excitation energy to excite the laser gas in the gas container 12 and cause electric discharge in the gas container 12. The laser gas in the gas container 12 is excited by the electric discharge to generate light. The generated light is amplified by a resonator, which is not shown in the drawing, and then output as laser from the gas laser oscillator 10. The power supply 16 has a known configuration. For example, the power supply 16 includes a power supply unit for outputting DC current in response to a control signal from the controller 30, and a matching unit for matching impedance between an input side and an output side and applying a voltage to the discharge electrode in response to the DC current output from the power supply unit.

Figure 2:
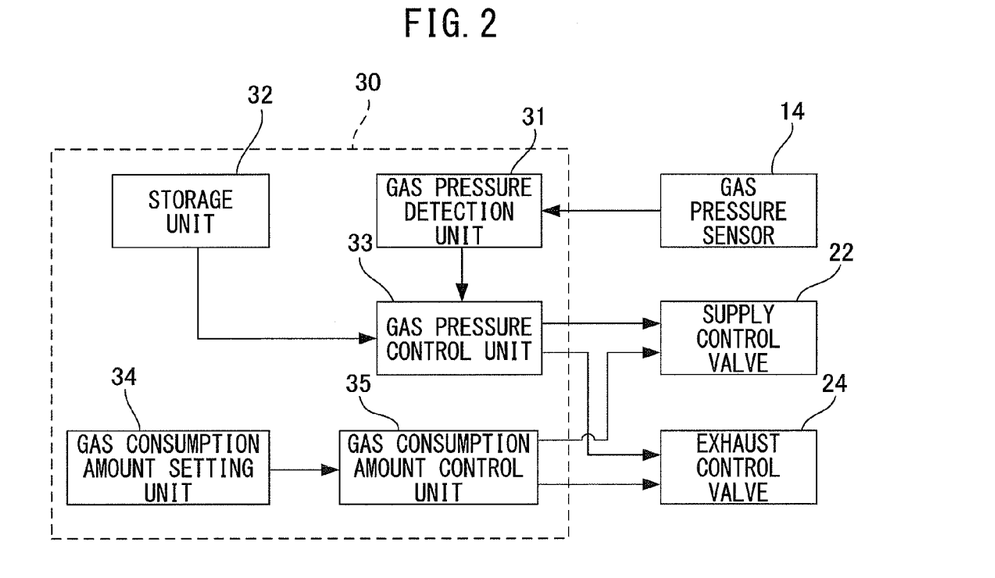
FIG. 2 is a functional block diagram of a controller in the first embodiment.

The controller 30 is a digital computer that includes a CPU, a ROM, a RAM, and interfaces capable of transmitting and receiving data and signals to and from external apparatuses, such as an input device and a display device. FIG. 2 is a functional block diagram of the controller 30. As depicted in the drawing, the controller 30 includes a gas pressure detection unit 31, a storage unit 32, a gas pressure control unit 33, a gas consumption amount setting unit 34, and a gas consumption amount control unit 35.

The gas pressure detection unit 31 detects a laser gas pressure in the gas container 12 by the gas pressure sensor 14. The laser gas pressure detected by the gas pressure detection unit 31 is input to the gas pressure control unit 33.

The storage unit 32 stores a reference gas pressure that is a control target value for laser gas pressure. The storage unit 32 also stores data indicating a relationship between the laser gas pressure in the gas container 12, the opening of the exhaust control valve 24, and an exhaust amount of laser gas exhausted through the exhaust control valve 24 (hereinafter, the data may be referred to as "relationship data").

Figure 6A:
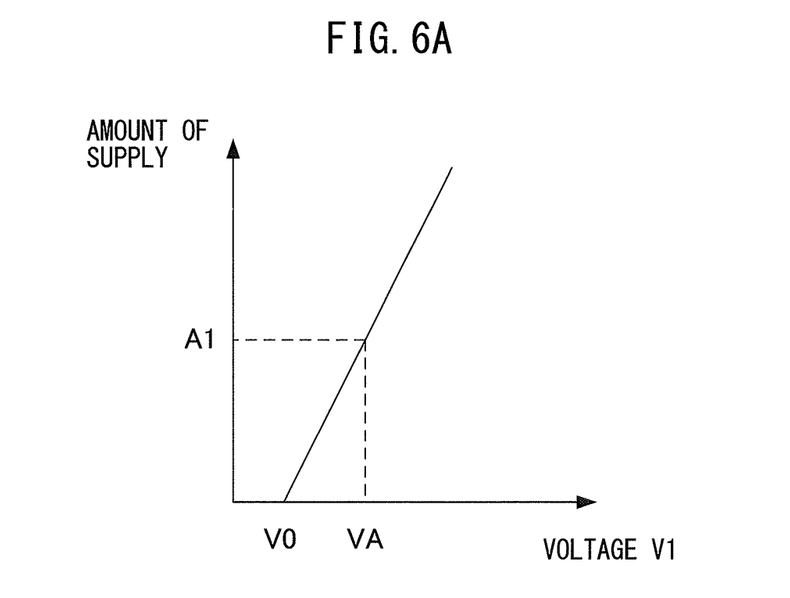
FIG. 6A is a graph showing a relationship between voltage input to a supply control valve and a supply amount of laser gas.
Figure 6B:
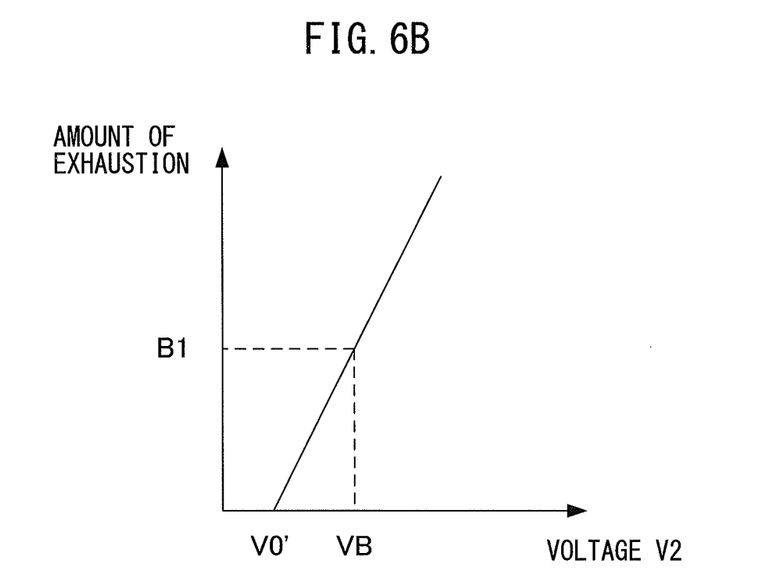
FIG. 6B is a graph showing a relationship between voltage input to an exhaust control valve and an exhaust amount of laser gas.

FIG. 6A is a graph showing a relationship between the voltage applied to the supply control valve 22 and the supply amount of laser gas. FIG. 6B is a graph showing a relationship between the voltage applied to the exhaust control valve 24 and the exhaust amount of laser gas. As described above, the openings of the supply control valve 22 and the exhaust control valve 24 are adjusted according to the input voltage or input current. FIGS. 6A and 6B indicate a relationship between the input voltage and the supply amount of laser gas and a relationship between the input voltage and the exhaust amount of laser gas, respectively. However, the same relationship is established between the input current and the supply amount of laser gas and between the input current and the exhaust amount of laser gas.

As depicted in FIGS. 6A and 6B, once the input voltage exceeds offset voltage V0 or V0', the supply amount of laser gas and the exhaust amount of laser gas increase, as the input voltages V1 and V2 increase. The offset voltages V0 and V0' are subject to change, depending on individual differences of the supply control valve 22 and the exhaust control valve 24, respectively. In the gas laser oscillator 10 according to the present embodiment, a relationship between the laser gas pressure, the input voltage V2 applied to the exhaust control valve 24, and the exhaust amount of laser gas is predetermined through experiments. An input voltage "VA" in FIG. 6A and an input voltage "VB" in FIG. 6B represent an input voltage corresponding to a target consumption amount, respectively.

Figure 7:
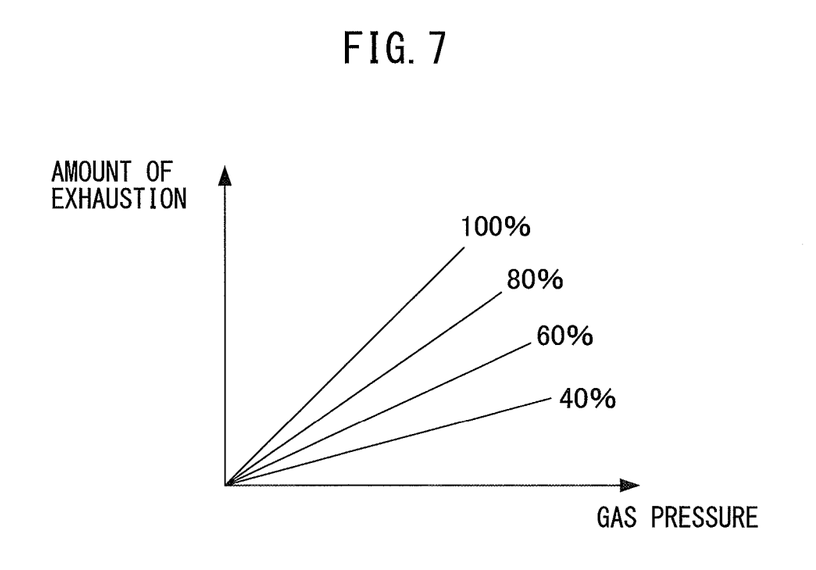
FIG. 7 is a graph showing a relationship between laser gas pressure, opening of the exhaust control valve, and an exhaust amount of laser gas.

FIG. 7 shows a relationship between the laser gas pressure in the gas container 12, the opening of the exhaust control valve 24, and the exhaust amount of laser gas. "40%," "60%," "80%" and "100%" in the graph indicate the openings of the exhaust control valve 24, respectively. In this way, the exhaust amount of laser gas is determined according to the laser gas pressure and the opening of the exhaust control valve 24, and the relationship therebetween is stored in the storage unit 32.

Referring back to FIG. 2, the gas pressure control unit 33 controls a voltage or a current applied to the supply control valve 22 and the exhaust control valve 24 such that the laser gas pressure in the gas container 12 acquired by the gas pressure detection unit 31 becomes closer to the reference gas pressure stored in the storage unit 32 (so as to fall within a predetermined range from the reference gas pressure). For example, when the detected laser gas pressure is lower than the reference gas pressure, the gas pressure control unit 33 increases the opening of the supply control valve 22 or reduces the opening of the exhaust control valve 24 or simultaneously executes both of them, so that the laser gas pressure in the gas container 12 increases.

The gas consumption amount setting unit 34 sets a target consumption amount of the laser gas. In the present embodiment, the target consumption amount is set to a constant value. For example, the target consumption amount is set so as to substantially eliminate an influence due to deterioration of the laser gas. The "deterioration of the laser gas" means, for example, a state where the laser gas in the gas container 12 changes in property. The "deterioration of the laser gas" may occur, for example, as a result of electrolytic dissociation of molecules of substances constituting the laser gas (for example, nitrogen molecules or carbon dioxide molecules), due to the electric discharge in the gas container 12. When a large number of molecules constituting the laser gas are electrolytically dissociated, the laser gas can no longer accumulate excitation energy, and thereby the output of laser is reduced. Thus, the gas laser oscillator 10 is configured such that a target consumption amount (for example, 8 to 12 liters per hour) of the laser gas is exhausted from the gas container 12, so as to replace the laser gas having changed properties.

The gas consumption amount control unit 35 controls the openings of the supply control valve 22 and the exhaust control valve 24 such that the exhaust amount of laser gas becomes closer to a target consumption amount. The exhaust amount of laser gas is determined from the laser gas pressure in the gas container 12 and the opening of the exhaust control valve 24, on the basis of the relationship data stored in the storage unit 32.

Figure 8:
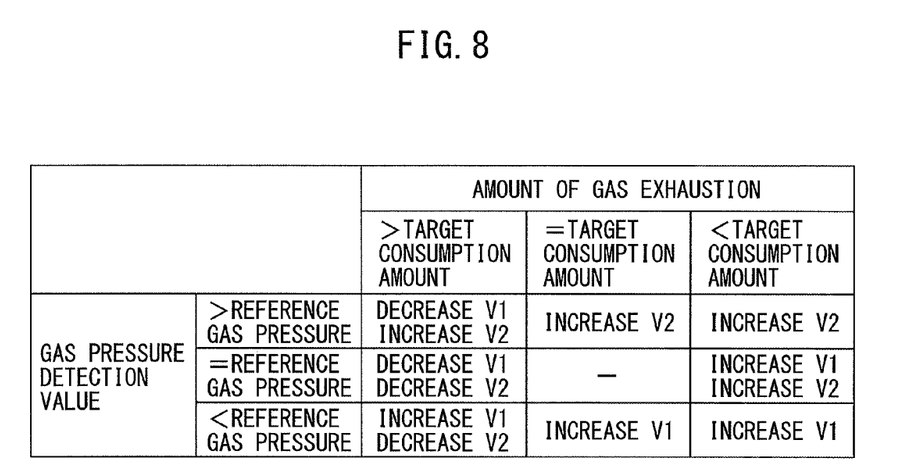
FIG. 8 is a table showing an exemplary manner in which the supply control valve and the exhaust control valve are controlled.

Thus, in the gas laser oscillator 10 according to the present embodiment, both of the gas pressure control unit 33 and the gas consumption amount control unit 35 control the openings of the supply control valve 22 and the exhaust control valve 24, respectively. FIG. 8 is a table showing an exemplary manner in which the supply control valve 22 and the exhaust control valve 24 are controlled. In the present embodiment, as will be described in detail below, while controlling the laser gas pressure toward a reference gas pressure, the exhaust amount of laser gas is controlled toward a target consumption amount.

(a) When the laser gas pressure in the gas container 12 is higher than the reference gas pressure:

In this case, the input voltage V2 to the exhaust control valve 24 is increased, thereby increasing the exhaust amount of laser gas. When the exhaust amount of laser gas is greater than the target consumption amount, the input voltage V1 to the supply control valve 22 is reduced.

(b) When the laser gas pressure in the gas container 12 is lower than the reference gas pressure:

In this case, the input voltage V1 to the supply control valve 22 is increased, thereby increasing the supply amount of laser gas. When the exhaust amount of laser gas is greater than the target consumption amount, the input voltage V2 to the exhaust control valve 24 is reduced.

(c) When the laser gas pressure in the gas container 12 is equal to the reference gas pressure and the exhaust amount of laser gas is greater than the target consumption amount:

In this case, the input voltage V1 to the supply control valve 22 and the input voltage V2 to the exhaust control valve 24 are reduced, respectively.

(d) When the laser gas pressure in the gas container 12 is equal to the reference gas pressure and the exhaust amount of laser gas is less than the target consumption amount:

In this case, the input voltage V1 to the supply control valve 22 and the input voltage V2 to the exhaust control valve 24 are increased, respectively.

It should be noted that in the case where "laser gas pressure is equal to the reference gas pressure" also includes a case where a laser gas pressure detected by the gas pressure detection unit 31 is within a predetermined range from the reference gas pressure.

The gas laser oscillator 10 according to the present embodiment provides the following effects:

(1) The supply control valve 22 and the exhaust control valve 24 are provided to control a supply amount of laser gas and an exhaust amount of laser gas, respectively. Accordingly, when a laser gas pressure in the gas container 12 is different from a reference gas pressure, the laser gas pressure can be quickly adjusted to the reference gas pressure. For example, when the laser gas pressure is higher than the reference gas pressure, the opening of the supply control valve 22 can be reduced and the opening of the exhaust control valve 24 can be increased. In other words, both of the supply amount and the exhaust amount of laser gas can be adjusted to adjust the laser gas pressure.

(2) The storage unit 32 stores in advance the relationship between the opening of the exhaust control valve 24, the laser gas pressure, and the exhaust amount of laser gas (i.e., the consumption amount of laser gas). Accordingly, the consumption amount of laser gas can be acquired without using a sensor for detecting the supply amount and the exhaust amount of laser gas. Thus, an inexpensive gas laser oscillator can be provided.

(3) Based on the relationship data, the exhaust amount of laser gas can be acquired from the laser gas pressure and the opening of the exhaust control valve 24. Thus, the laser gas pressure can be controlled, and, at the same time, the consumption amount of laser gas can be controlled.

In the first embodiment, the gas consumption amount setting unit 34 sets the target consumption amount to a constant value. However, in another embodiment, the gas consumption amount setting unit 34 may be configured to set the target consumption amount according to an operation state of the gas laser oscillator 10. For example, when the gas laser oscillator 10 has a low operation rate, for example, when the gas laser oscillator 10 is in a stand-by state, it can be assumed that degeneration of the laser gas hardly occurs. Thus, influence on performance of the gas laser oscillator 10 due to deterioration of the laser gas is limited, so that a small amount of laser gas exhausted from the gas container 12 may be sufficient.

For example, when the operation rate of the gas laser oscillator 10 is 100%, the gas consumption amount setting unit 34 sets the target consumption amount of the laser gas to a value within a range of from 8 to 12 liters per hour. On the other hand, when the operation rate of the gas laser oscillator 10 is 0%, the gas consumption amount setting unit 34 sets the target consumption amount of the laser gas to a value within a range of from 3 to 7 liters per hour.

The gas consumption amount setting unit 34 may also be configured to set the target consumption amount to a lower value when the supply and the shut-off of the excitation energy from the power supply 16 are frequently switched. Upon the supply and the shut-off of the excitation energy, temperature of the laser gas momentarily changes and consequently the laser gas pressure changes. This temporarily increases the consumption amount of laser gas needed to execute the control of the laser gas pressure. However, by setting the target consumption amount to a lower value according to the present embodiment, wasteful consumption of the laser gas can be avoided until the operation state of the gas laser oscillator 10 is stabilized.

As described above, by changing the target consumption amount of the laser gas according to the operation state of the gas laser oscillator 10, wasteful consumption of the laser gas can be avoided, leading to the decreased operation cost of the gas laser oscillator 10.

Figure 3:
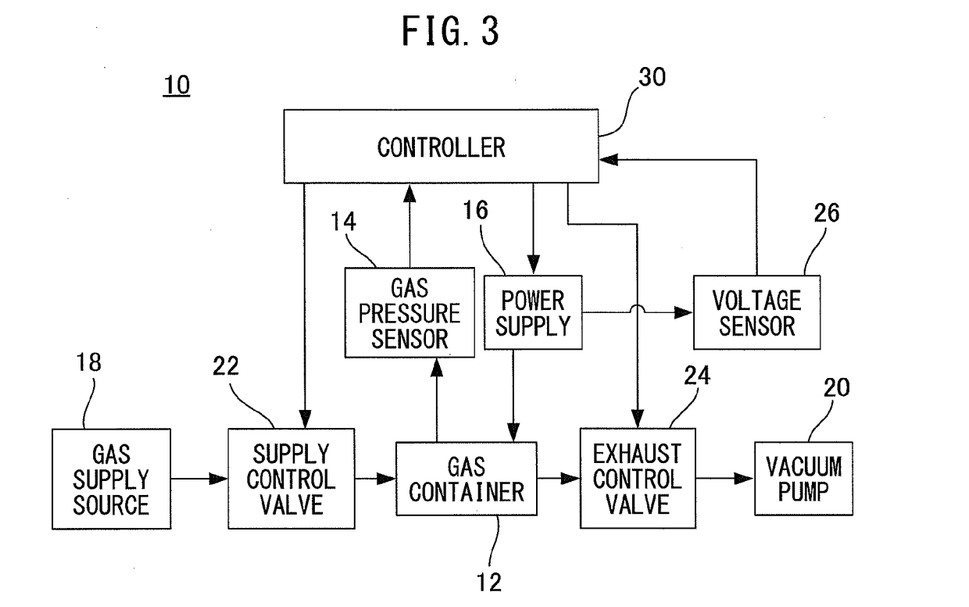
FIG. 3 is a diagram depicting a configuration of a gas laser oscillator according to a second embodiment.

FIG. 3 is a diagram depicting a configuration of a gas laser oscillator 10 according to a second embodiment. In the present embodiment, the consumption amount of laser gas is controlled according to the state of the laser gas. In addition to the configuration of the above-described embodiment, the gas laser oscillator 10 of the present embodiment further includes a voltage sensor 26 for detecting a voltage applied by the power supply 16 when applying excitation energy to the laser gas. Further, as can be seen with reference to FIGS. 2 and 4, the controller 30 also includes a comparison unit 36.

When the gas laser oscillator 10 is stopped for a long time, for example, for one day or longer and replacement of the laser gas is not executed, an impurity may be mixed into the laser gas. The "impurity" means, for example, laser gas which contains moisture or helium of a less composition ratio. In particular, since helium, water or the like have a smaller molecular weight, they can pass through a sealing member (an O-ring or resin piping element) to the outside of the gas container 12, or may enter into the gas container 12. Impurity mixing may be negligible when the gas laser oscillator 10 is in operation. However, when restarting the gas laser oscillator 10 after stoppage of a long time, the impurity contained in the laser gas affects the supply of the excitation energy. Specifically, the voltage or current of the power supply 16 necessary to apply the excitation energy increases more than a reference value, leading to unstable electric discharge.

According to the present embodiment, the reference voltage is compared with a voltage actually applied by the power supply 16, in order to evaluate the influence of the impurity contained in the laser gas, and based on the result of the evaluation, the target consumption amount of the laser gas is changed.

Figure 4:
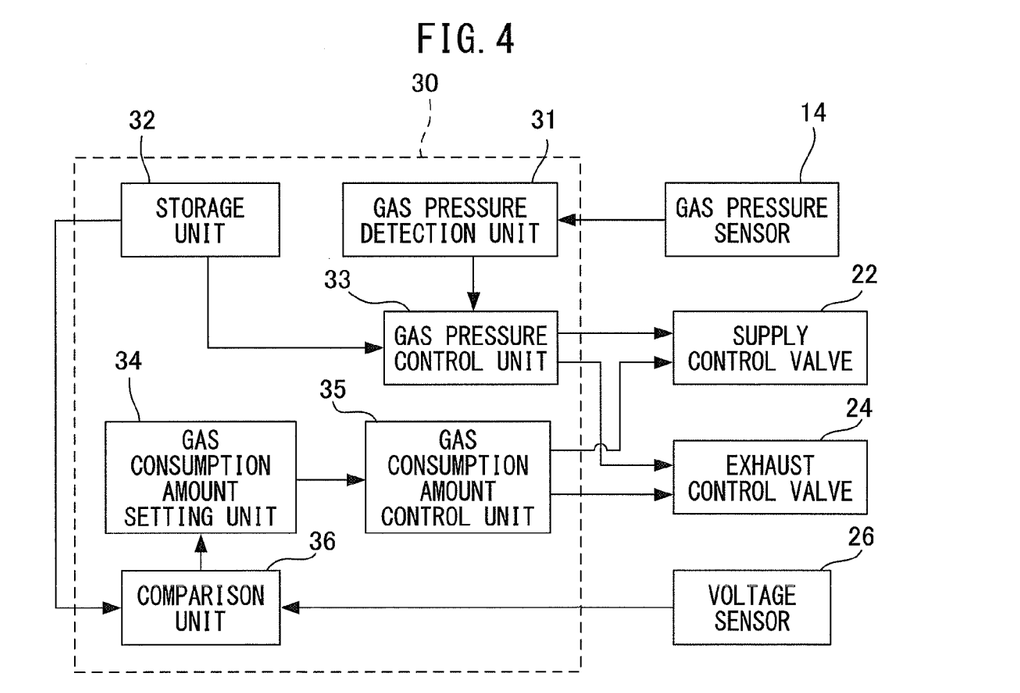
FIG. 4 is a functional block diagram of a controller in the second embodiment.

In the present embodiment, the storage unit 32 stores a reference voltage that serves as a reference in applying excitation energy. The comparison unit 36 compares the reference voltage stored in the storage unit 32 with a voltage detected by the voltage sensor 26. The gas consumption amount setting unit 34 sets a target consumption amount of the laser gas according to the result of comparison by the comparison unit 36. Specifically, when the detected voltage is greater than the reference voltage, the gas consumption amount setting unit 34 determines that the laser gas contains an impurity and increases the target consumption amount of the laser gas. This promotes exhaustion of the laser gas containing the impurity.

According to the present embodiment, the comparison unit 36 compares the reference voltage with a detected voltage in order to automatically detect impurity mixing into the laser gas in the gas container 12. Then, based on the detection result, a target consumption amount is set to exhaust the laser gas containing the impurity from the gas container 12. Accordingly, the gas laser oscillator 10 can be started stably even after the stoppage for a long time. Although the embodiment has been described in which the reference voltage is compared with the detected voltage to adjust the target consumption amount of the laser gas, current may be monitored, instead of the voltage, and the target consumption amount of the laser gas may be adjusted based on the result of the comparison between the reference current and the detected current.

EFFECT OF THE INVENTION

According to the gas laser oscillator of the present invention, the control valves are provided on each of the laser gas supply side and the laser gas exhaustion side to control the supply amount and the exhaust amount of laser gas. Furthermore, according to data indicating the relationship between the laser gas pressure, the openings of the control valves, and the exhaust amount of laser gas, the openings of the control valves are controlled so as to obtain a desired exhaust amount of laser gas. In this way, without using detection means for detecting the supply amount and the exhaust amount of laser gas, the laser gas pressure can be controlled at high speed and with high precision, and also the consumption amount of laser gas can be controlled.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:
1. A gas laser oscillator, comprising:
a gas container for containing a laser gas;
a first sensor for detecting a laser gas pressure in the gas container;
a gas supply source for supplying the laser gas into the gas container;
a vacuum pump for exhausting the laser gas from the gas container;
a first control valve capable of controlling a supply amount of laser gas supplied into the gas container by adjusting an opening of the first control valve;
a second control valve capable of controlling an exhaust amount of the laser gas exhausted from the gas container by adjusting an opening of the second control valve; and
a controller for controlling the openings of the first control valve and the second control valve, respectively, the controller comprising:
a first storage unit for storing data that indicates a relationship between the laser gas pressure in the gas container, the opening of the second control valve, and the exhaust amount of the laser gas;
a gas pressure control unit for controlling the openings of the first control valve and the second control valve, respectively, such that the laser gas pressure in the gas container becomes closer to a reference gas pressure; and
a gas consumption amount control unit for controlling the openings of the first control valve and the second control valve, respectively, such that the exhaust amount of the laser gas becomes closer to a target consumption amount.

2. The gas laser oscillator according to claim 1, further comprising:
a power supply for supplying excitation energy for the laser gas in the gas container; and
a second sensor for detecting a voltage or a current supplied from the power supply,
wherein the controller further comprises:
a second storage unit for storing a reference voltage or a reference current;
a comparison unit for comparing the voltage or the current detected by the second sensor with the reference voltage or the reference current; and
a gas consumption amount setting unit for setting the target consumption amount on the basis of a result of the comparison by the comparison unit.

3. The gas laser oscillator according to claim 1, wherein the controller further comprises a gas consumption amount setting unit for setting the target consumption amount according to an operation state of the gas laser oscillator.

* * * * *